United States Patent [19]

DaSilva

[11] Patent Number: 4,655,170
[45] Date of Patent: Apr. 7, 1987

[54] ANIMAL IDENTIFICATION FEED CONTROL SYSTEM

[76] Inventor: Daniel R. DaSilva, 234 N. Juanita Ave., Redondo Beach, Calif. 90277

[21] Appl. No.: 803,241

[22] Filed: Dec. 2, 1985

[51] Int. Cl.$^4$ ............................................... A01K 5/02
[52] U.S. Cl. ................................................. 119/51 R
[58] Field of Search .............. 119/51 R; 340/870.31, 340/870.32; 338/32 H; 301/179, 180

[56] References Cited

U.S. PATENT DOCUMENTS

| | | | |
|---|---|---|---|
| 4,129,855 | 12/1978 | Rodrain | 119/51 R X |
| 4,288,856 | 9/1981 | Linseth | 119/51 R X |
| 4,349,814 | 9/1982 | Akehurst | 338/32 H X |
| 4,426,955 | 1/1984 | Monroe et al. | 119/51 R |
| 4,475,481 | 10/1984 | Carroll | 119/51 R |
| 4,532,892 | 8/1985 | Kuzara | 119/51 R |

Primary Examiner—Hugh R. Chamblee
Attorney, Agent, or Firm—Roger A. Marrs

[57] ABSTRACT

An automatic feed system is disclosed for livestock which identifies each of a plurality of animals and selectively feeds certain animals while monitoring the feeding procedure. The system includes a magnetically encoded identification module worn about the animal's neck operating in cooperation with a magnetic decoder fixedly secured at the front of a feeding bin or hopper. A multiplexer sequentially detects the signals generated by the decoder and processes the signals to a microprocessor via an amplifier signal conditioner and an analog to digital converter. The output of the microprocessor is operably coupled to a feed control and automatic gate for dispensing a predetermined amount of feed. A readout is available for animal record keeping and system review.

7 Claims, 5 Drawing Figures

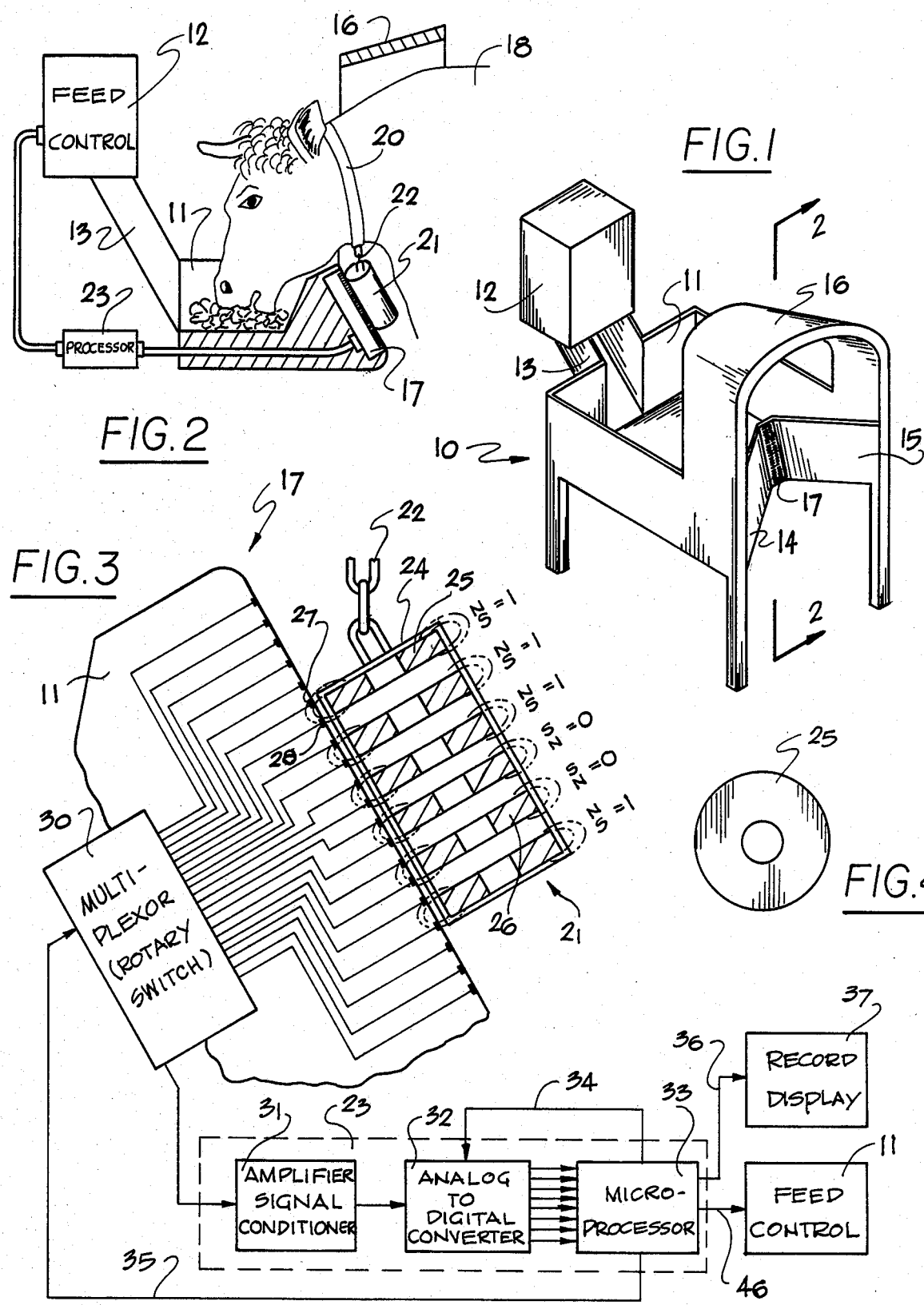

4,655,170

ANIMAL IDENTIFICATION FEED CONTROL SYSTEM

BACKGROUND OF THE INVENTION

1. Field of the Invention

The present invention relates to the field of animal husbandry and, more particularly, the invention is applicable to an identification system for identifying individual animals and to a means for regulating their feed depending upon the individual dietary requirement.

2. Brief Description of the Prior Art

Generally, in the raising of certain types of livestock such as in the practice of dairy farming and beef production, it is often desired to feed particular animals certain supplemental feeds at particular times during their growth or milk producing cycle. For instance, at certain periods of the animal's development, particular diets and amounts of feed are an advantage. Also, in milk production, certain periods of the animal's milk producing cycle requires supplemental feeds in order to obtain maximum production.

It is the common practice in modern dairy and beef farms to confine the animals in feed lots wherein the animals are fed hay, fodder, or other conventional feeds and are not permitted to have access to natural pasture. In the feed lot manner of raising cows and cattle, for example, the ability to provide supplemental feed to selected animals is particularly advantageous.

Several attempts have been made to automate the feeding of such animals. To optimize milk yield in dairy cows, automated computer systems are being utilized to collect data on each animal and to automatically dispense feed to each animal. The amount of feed dispensed to a particular animal depends on its age, its health, and its stage in the lactation cycle and, hence, it is necessary to identify each such animal. Numerous devices are known for enabling the visual identification of dairy animals including ear tags, neckbands and chains, tailbands and blank markers. However, such visual identification of animals requires the manual entry of identification data into the computer system of the proper identifying code which is both expensive and subject to error.

Automatic animal identification systems have updated the visual and manual systems. However, these include a passive transponder which is attached to, or implanted in, the animal. This transponder is triggered when the animal passes through an archway of energized coils. When thus triggered, the transponder transmits a unique signal or code to a receiver which identifies the animal. Difficulties and problems have been encountered with such automated systems which stem from their high cost, size, and susceptibility to noise and other severe environmental conditions which interfere with the identification code and the sensing thereof.

Therefore, a longstanding need has existed to provide a novel animal identification system and means for controlling feed for a particular animal which is simple to use, economical to manufacture, and does not require visual observation of the feeding procedure, manual entry of data into books and records, and which will automatically identify the animal as well as dispense feed in accordance with the needs of the particular animal.

SUMMARY OF THE INVENTION

Accordingly, the above problems and difficulties are obviated by the present invention which provides a novel animal identification feed control system having a magnetically encoded identification means worn about the animal's neck operating in cooperation with a magnetic decoder secured at the front of the feeding bin or hopper. The magnetic field present at the encoded means is sensed by a decoder which generates a signal to a microprocessor via a multiplexer, amplifier, and analog to digital converter. The output of the microprocessor is operably coupled to a feed control and automatic gate for dispensing a predetermined amount of feed. Record or display means are operably connected to the microprocessor for recording purposes which may be maintained in a storage medium.

Therefore, it is among the primary objects of the present invention to provide a novel animal identification feed control system which includes a magnetically encoded identification module carried on the animal for producing a coded magnetic field which is sensed by a detector sequentially producing output signals introduced to a microprocessor for record and control purposes.

Another object of the present invention is to provide a novel animal identification feed control system which is simple to install, economic to manufacture, and one which may be readily used by unskilled persons to identify a particular animal from a herd and which will automatically provide a predetermined amount of feed to the selected animal.

Still another object of the present invention is to provide a novel automatic feeding system for animals which includes a magnetic encoder producing a special field of magnetic information which is sensed by a magnetic decoder so that signals are produced that may be processed for a variety of functions and purposes.

Yet another object of the present invention is to provide a novel automatic feed system for livestock which identifies each in a plurality of animals and selectively feeds certain animals while monitoring the feed procedure with respect to the identification of the animal and the amount of feed being provided.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIG. 1 is a front perspective view of a feed bin or hopper for holding feed intended to be consumed by an animal;

FIG. 2 is a transverse cross-sectional view of the bin or hopper shown in FIG. 1 as taken in the direction of arrows 2—2 thereof;

FIG. 3 is a diagrammatic drawing illustrating the animal identification feed control system incorporating the present invention;

FIG. 4 is an enlarged plan view of a typical magnet used in the modular arrangement shown in FIG. 3.

DESCRIPTION OF THE PREFERRED EMBODIMENT

Figure 5:
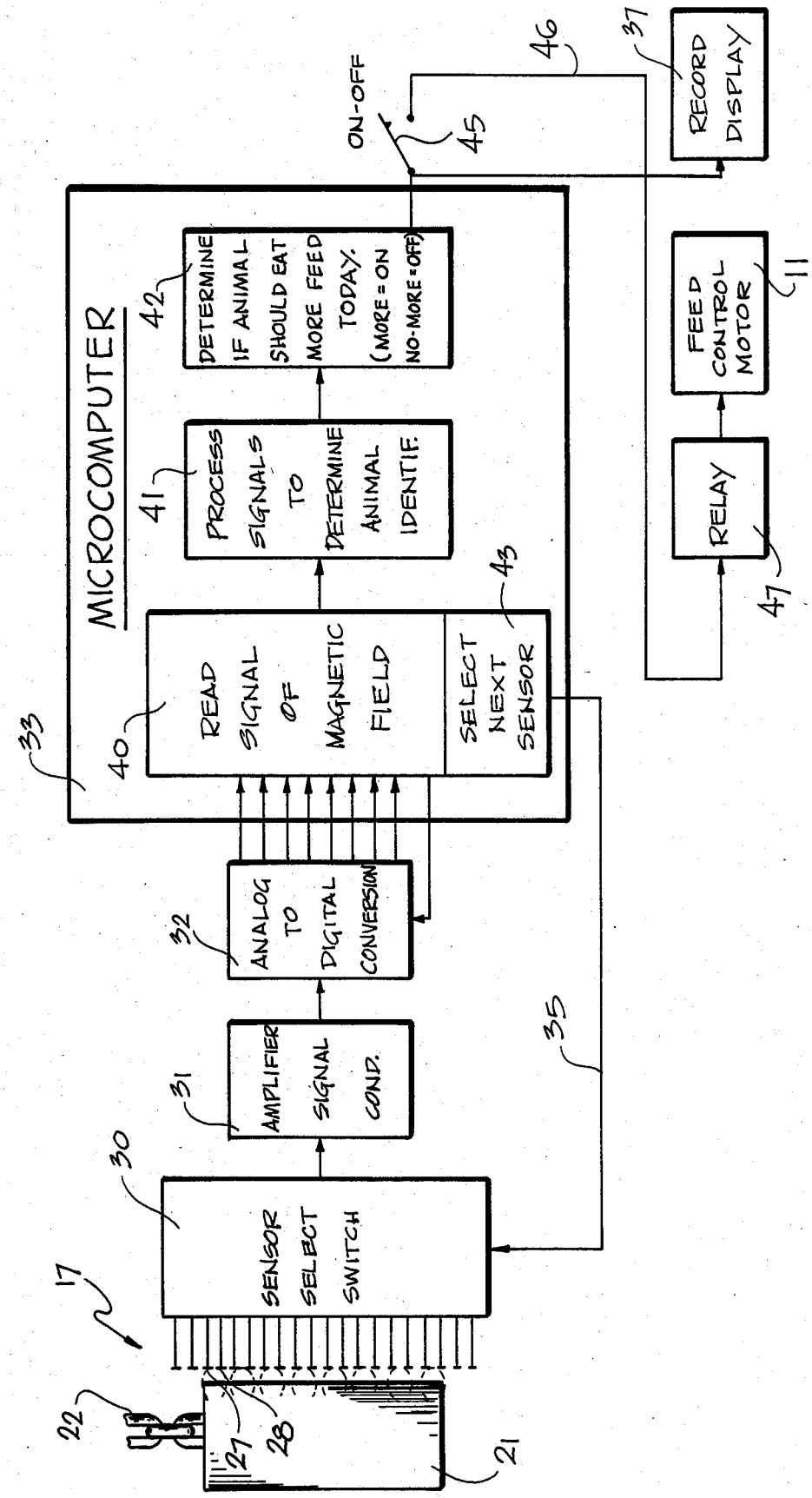
FIG. 5 is a block diagram of the system shown in FIG. 3.

Referring to FIG. 1, a feeding device for animals is indicated in the general direction of arrow 10 which includes a box-like bin 11 for holding a quantity of animal feed. The bin 11 is provided with feed which is stored in a controlled feed hopper 12 which includes an automatic control for opening a gate to release a predetermined quantity of feed into the bin 11. The hopper 12 is connected to the bin via a chute 13 carried in the sidewall of the bin. The opposite end of the bin from its end carrying the feed control 12 is provided with a pair of converging sidewalls 14 and 15 which diverge together at the mid section of the bin and cooperate to form a guide means by which the animal is directed towards the center of the bin and to place its head in the immediate proximity of the juncture between the converging sidewalls 14 and 15. The animal's head is further guided or directed in a downward direction by means of an arch 16 through which the animal places its head in order to feed.

The juncture of the converging sidewalls 14 and 15 serve to house a sensing means (to be described later) for detecting the presence and identification of an individual animal during the feeding procedure. The sensing means is broadly identified by the numeral 17 and cooperates with the converging sidewalls 14 and 15 as well as the arch 16 for performing its detection function.

Referring now in detail to FIG. 2, it can be seen that the animal is represented by numeral 18 and that its head is in position for consuming the feed placed in the bin 11. The animal has been guided into this position by means of the arch 16 and the converging sidewalls 14 and 15 as previously described. The animal 18 carries a signaling means about its neck by means of a neckstrap 20 which carries an identification module 21 beneath the neck of the animal. The module 21 downwardly depends from the strap 20 by means of a universal joint connection which may take the form of a chain, rope or other means permitting the module 21 to swing under the control of gravity. Such a connection between the module and the strap is indicated by numeral 22.

It is also to be noted that the forward end of the bin 11 is angled so that the sensor means 17 is angularly disposed with respect to a vertical plane. Such a construction provision permits the module 21 to lie against the sensing means when the animal's head is in a feeding position as illustrated. The module will not swing from side to side when in this position due to the converging sidewalls 14 and 15 which will keep the module in alignment with the sensing means. The sensing means detects coded signals from the identification module 21 which are then introduced to a processor 23 where raw information is converted into data signals for automatically operating the feed control 12.

Referring to FIG. 3, it can be seen that the identification module 21 includes a magnetically encoded identification system which identifies the animal during feeding. The module 21 consists of a cylindrical housing 24 filled with a plurality of permanent magnets wherein each magnet is in the shape of a washer such as shown by numeral 25 in FIG. 4. Each magnet produces a code in the form of a magnetic force field wherein the particular code is dependent on the particular magnetic orientation of a specific washer. Therefore, inasmuch as the magnetic field produces a north/south orientation, a binary coded signal in terms of an overall force field is generated. As illustrated, washer 25, in FIG. 3, produces a north/south magnetic field which can be assigned as a binary number one. In contrast, a washer 26 in the spec produces a magentic field representing south/north which constitites a binary numeral zero. Therefore, the identification number of the animal is set forth by the magnetically encoded information module 21 in terms of the force field about each of the respective washers. It is to be noted that the washers are separated from one another in the cylindrical housing 24 so that the force field present about the periphery of each washer is magnetically clear and distinct from its adjacent washer.

FIG. 3 also illustrates in diagrammatic form, the sensing means 17 wherein a plurality of probes, such as probes 27 and 28 are arranged in a line so as to magnetically sense the force field derived from each one of the respective magnet washers. The pair of probes 27 and 28 are aligned so as to respond to the force field generated by the washer 25. Magnetic sensing by the plurality of probes is achieved by what is conventionally referred to as the Hall effect.

In order to process the detected identification force field from the module 21, a multiplexer 30 is employed which may take the form of a rotary switch for sequentially conducting the sensed signals from each pair of probes to the processor 23. The signals from the mulitplexer 30 are introduced to an amplifier signal conditioner 31 and then to an analog-to-digital converter 32 where the binary information is then introduced to a microcomputer 33 which is typically manufactured by Rockwell Mfg. under the name of AIM 65. One of the outputs from the microprocessor travels along line 34 to the analog-to-digital converter and may be referred to as a read signal. Another signal travels along line 35 back to the multiplexer 30 which may be referred to as a channel select signal and still another output travels along line 36 to record or display unit 37 wherein a history of the feeding procedure is noted. The microproceesor 33 also provides a series of go/no-go signals to the feed control 11.

The microprocessor 33 will read the analog-to-digital converter information even with no animal present so as to determine the null voltage for each Hall probe. When an animal is present at the feeding bin 11, the probes will be sensed again and the difference between this reading and the null reading will be taken. In this way, all offset errors in the system will be canceled to zero. The differences will be scanned to determine the orientation of each magnet and then the identification code of the module can be identified. When this procedure has been completed, the animal will have been identified and control of feeding can take place.

Referring now in detail to FIG. 5, it can be seen that the analog-to-digital converter 32 introduces a plurality of binary signals to a signal reader 40 within the microprocessor or microcomputer 33. After detection of these signals, they are introduced to a processor 41 which determines the animal's identification and this information is then forwarded to a type of go/no-go circuit 42 intended to indicate more feed for the animal or no more feed for the animal. Additionally, the signal reader 40 actuates a select-next sensor 43 which generates a signal along line 45 for channel selection at the multiplexer or sensor select switch 30.

An on-off switch 45 is included in an ouput line 46 which interconnects the microprocessor to a feed control 11 via a relay 47.

Therefore, it can be seen that the animal identification system of the present invention provides a means for guiding the animal into a critical location at the bin 11 so that the dangling magnetically coded signals of module 21 can be sensed by the plurality of probes. By employing the principals of the Hall effect, the probes will generate a signal which are sensed sequentially by the multiplexer 30 and these signals are then processed for control purposes in energizing the feed control 11 and the recorder 37.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. An animal identification feed control system comprising the combination of:
    a magnetically encoded identification module carried on the animal;
    a feed bin for holding a quantity of feed;
    a magnetic decoder secured on said bin for detecting coded information carried on said identification module;
    a microprocessor operably coupled to said decoder for receiving signals therefrom and for generating control signals in response thereto;
    a feed control mechanism operably connected to said microprocessor and responsive to said control signals for dispensing feed into said bin;
    said decoder is coupled to said microprocessor by a multiplex device for sequentially decoding detected magnetic signals from said encoded module;
    said encoder module including a coaxial stack of washer permanent magnets arranged in fixed spaced apart relationship;
    each of said magnetic field assigned a given binary number depending upon the polarity of the magnetic force field; and
    the combination of said force fields defining a coded identification of a particular animal.

2. The invention as defined in claim 1 wherein:
    said encoder module downwardly depends from the neck of the animal in loose swingable fashion; and
    said bin having a V-shaped receptacle for orientating said module with respect to said decoder whereby said said module force field is detected by said decoder.

3. The invention as defined in claim 2 wherein:
    said decoder includes a plurality of probes for detecting the magnetic force field of said module magnets; and
    said decoder further includes a rotary switch for sequentially and serially.detecting said force fields.

4. The invention as defined in claim 3 wherein:
    said decoder probes employ the Hall Effect process for deriving signal information from said module magnet force fields.

5. The invention as defined in claim 4 including:
    a record means operably connected to said microprocessor for recording information pertinent to the animal feeding procedure.

6. The invention as defined in claim 5 wherein:
    signal conditioner means and an analog-to-digital converter are coupled in series between said rotary switch and said microprocessor.

7. The invention as defined in claim 6 wherein:
    said feed bin includes a pair of converging sidewalls guiding the animal so that said module rests at the apex of said sidewalls immediately adjacent to said decoder.

* * * * *